United States Patent
Suzuki

(10) Patent No.: US 6,937,364 B2
(45) Date of Patent: Aug. 30, 2005

(54) IMAGE PROCESSING APPARATUS

(75) Inventor: Minoru Suzuki, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 857 days.

(21) Appl. No.: 09/725,686

(22) Filed: Apr. 5, 2001

(65) Prior Publication Data

US 2002/0145764 A1 Oct. 10, 2002

(51) Int. Cl.⁷ .................................................. H04N 1/40
(52) U.S. Cl. ..................................... 358/1.9; 358/434
(58) Field of Search ................................. 358/1.9, 1.15, 358/411–412, 426.02–426.42, 434–439; 327/548

(56) References Cited

U.S. PATENT DOCUMENTS 6,396,314 B1 * 5/2002 Roth .......................... 327/107
6,437,616 B1 * 8/2002 Antone et al. ............... 327/158
6,686,802 B2 * 2/2004 Maeda ........................ 331/1 A

FOREIGN PATENT DOCUMENTS

| JP | 7-38776 | 2/1995 |
| JP | 9-200026 | 7/1997 |
| JP | 11-143570 | 5/1999 |

\* cited by examiner

Primary Examiner—Thomas D. Lee
Assistant Examiner—Stephen Brinich
(74) Attorney, Agent, or Firm—Foley & Lardner LLP

(57) ABSTRACT

An image processing circuit is provided in which a clock signal is divided according to bits of data input thereto and supply or interruption of the divided clock signals is controlled according to the value of the input data. Therefore, it becomes possible to interrupt the clock signal which is to be supplied for a bit among the bits of the input data which is not used for a long period of time and reduce the power consumption of the circuit.

4 Claims, 7 Drawing Sheets

IMAGE PROCESSING APPARATUS

BACKGROUND OF THE INVENTION

For example, this invention relates to an image processing circuit for effecting an image process of a plurality of processing steps, an image processing apparatus such as an image forming apparatus including the image processing circuit, for printing an image read by a scanner by use of a printer and a control method for the image processing circuit.

Conventionally, an image forming apparatus such as a digital copying machine includes an image processing LSI used as an image processing circuit for effecting an image process of a plurality of processing steps. A common clock is always supplied to an internal circuit of the image processing LSI during the image data processing operation irrespective of the contents of data.

For example, image data processed by the digital copying machine contains data having low-level pixel values of a white ground or the like in many cases. When such image data is processed, particularly, upper bits of data of pixel values (density values) are practically kept at the same value for a long period of time.

However, the conventional image processing circuit is operated only by one common clock for all of the bits. Therefore, the clock is always supplied for the upper bits whose pixel values are kept unchanged in practice for a long period of time, thereby making it difficult to attain the low power consumption of the image processing LSI.

BRIEF SUMMARY OF THE INVENTION

This invention has been made to solve the problem that a common clock is always supplied for all of the bits while the values of particular bits are kept unchanged for a long period of time so as to make it difficult to attain the low power consumption of the image processing LSI and an object of this invention is to provide an image processing circuit, image processing apparatus and image processing circuit control method in which the low power consumption of the image processing circuit can be attained while the values of particular bits are kept unchanged for a long period of time.

An image processing circuit of this invention driven by a clock signal for processing data expressed by a plurality of bits comprises a level determining section for determining whether or not a value of input data is smaller than a preset value; and a clock control section for supplying a clock signal that makes a bit corresponding to the preset value active, when the level determining section determines that the value of the input data is not smaller than the preset value and interrupting supply of a clock signal that makes a bit corresponding to the preset value active, when the level determining section determines that the value of the input data is smaller than the preset value.

An image processing apparatus of this invention including an image processing circuit driven by a clock signal for processing data expressed by a plurality of bits comprises a level determining section for determining whether or not a density value of image data input to the image processing circuit is smaller than a preset density value; and a clock control section for supplying a clock signal that makes a bit corresponding to the preset density value active, when the level determining section determines that the density value of the input image data is not smaller than the preset density value and interrupting supply of a clock signal that makes a bit corresponding to the preset density value active, when the level determining section determines that the density value of the input image data is smaller than the preset density value.

An image processing circuit control method of this invention for controlling an image processing circuit driven by a clock signal for processing data expressed by a plurality of bits comprises a first step of determining whether or not a value of input data is smaller than a preset value; and a second step of supplying a clock signal that makes a bit corresponding to the preset value active, when it is determined in the first step that the value of the input data is not smaller than the preset value and interrupting supply of a clock signal that makes a bit corresponding to the preset value active, when it is determined in the first step that the value of the input data is smaller than the preset value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principle of the invention.

DETAILED DESCRIPTION OF THE INVENTION

There will now be described an embodiment of this invention with reference to the accompanying drawings.

Figure 1:
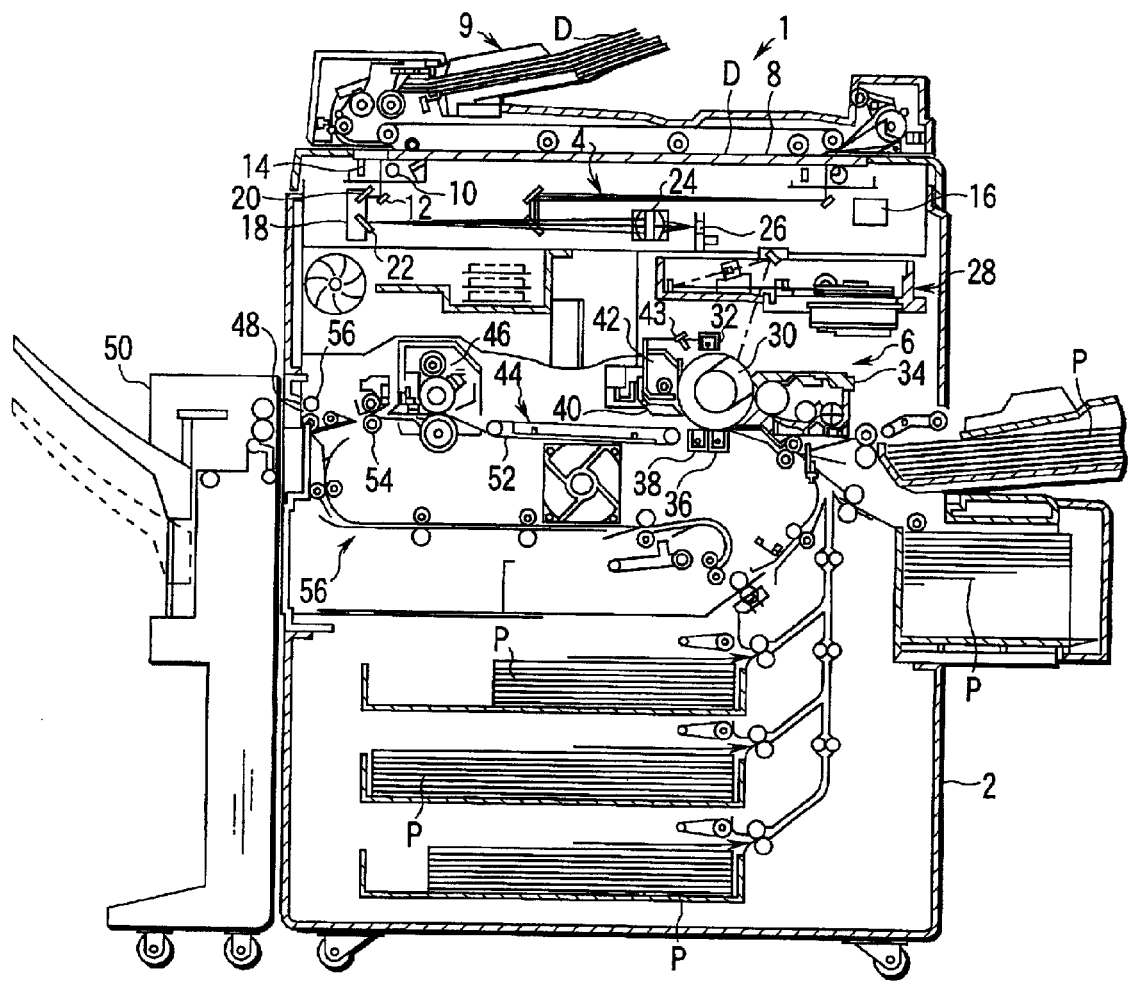
FIG. 1 is a cross sectional view showing the schematic structure of a digital copying machine according to an embodiment of this invention.

FIG. 1 is a cross sectional view showing the schematic structure of a digital copying machine 1 as an example of an image forming apparatus according to this invention.

As shown in FIG. 1, the digital copying machine 1 has an apparatus main body 2 and a scanner section 4 used as image reading means and a printer section 6 functioning as image forming means are provided in the apparatus main body 2.

On the upper surface of the apparatus main body 2, a document placing table 8 formed of a transparent glass plate on which a to-be-read object, that is a document D is placed is disposed. Further, on the upper surface of the apparatus main body 2, an automatic document feeder (which is hereinafter referred to as ADF) 9 for automatically feeding a document D onto the document placing table 8 is disposed.

The scanner section 4 disposed in the apparatus main body 2 includes an exposure lamp 10 constructed by, for example, a halogen lamp used as a light source for illuminating the document D placed on the document placing table 8 and a first mirror 12 for deflecting light reflected from the document D in a preset direction and the exposure lamp 10 and first mirror 12 are mounted on a first carriage disposed below the document placing table 8.

The first carriage 14 is disposed to be movable in parallel to the document placing table 8 and is reciprocally moved below the document placing table 8 by means of a scanner motor (driving motor) 16 via a toothed belt (not shown) or the like. The scanner motor 16 is constructed by a stepping motor, for example.

Further, a second carriage 18 which is movable in parallel to the document placing table 8 is disposed below the document placing table 8. A second mirror 20 and third mirror 22 for sequentially deflecting light reflected from the document D and deflected by the first mirror 12 are disposed at right angles with each other on the second carriage 18. The second carriage 18 is driven by the toothed belt or the like for driving the first carriage 14 so that rotation force can be transmitted to the second carriage 18 from the scanner motor 16 and the second carriage may follow the first carriage 14 and can be moved in parallel to the document placing table 8 at a speed which is half of the speed of the first carriage.

Below the document placing table 8, an image forming lens 24 for focusing the reflected light from the third mirror 20 on the second carriage 18 and a CCD sensor (line sensor) 26 for receiving the reflected light focused by the image forming lens 24 and photoelectrically converting the reflected light are disposed. The image forming lens 24 is disposed to be movable via a driving mechanism in a plane containing the optical axis of light deflected by the third mirror 20 and forms an image by use of the reflected light with desired magnification (in the main scanning direction) by the movement thereof. Then, the CCD sensor 26 photoelectrically converts the incident reflected light according to an image processing clock supplied from a main CPU which will be described later and outputs an electrical signal corresponding to the read image of the document D. The magnification in the sub-scanning direction can be adjusted by changing the moving speed of the first carriage 14.

The printer section 6 includes a laser exposure unit 28 acting as latent image forming means. The outer surface of a photosensitive drum 30 is scanned by use of laser light from the laser exposure unit 28 to form an electrostatic latent image on the outer surface of the photosensitive drum 30.

Further, the printer section 6 has the photosensitive drum 30 which is rotatable as an image carrying body disposed in substantially the central portion of the apparatus main body 20 and the outer surface of the photosensitive drum 30 is exposed by the laser light emitted from the laser exposure unit 28 and a desired electrostatic latent image is formed thereon. An electric charger 32 for charging the outer surface of the drum with a preset amount of charges, a developing unit 34 for supplying toner used as a developing agent to the electrostatic latent image formed on the outer surface of the photosensitive drum 30 to develop the latent image with desired image density, a transfer charger 38 having a separation charger 36 integrally formed therewith for separating an image forming medium, that is, copy paper P fed from a paper cassette to be described later, for transferring the toner image formed on the photosensitive drum 30 to the paper P, a separation claw 40 for separating the copy paper P from the outer surface of the photosensitive drum 30, a cleaning unit 42 for removing toner remaining on the outer surface of the photosensitive drum 30 and a discharging unit 43 for discharging the outer surface of the photosensitive drum 30 are disposed in this order around the photosensitive drum 30.

In the side and lower portions of the apparatus main body 2, a large-capacity feeder and cassettes which can be withdrawn from the apparatus main body 2 are disposed.

In the apparatus main body 2, a feeding path 44 extending from the cassettes and large-capacity feeder along the transferring section lying between the photosensitive drum 30 and the transfer charger 38 is formed, and at the end of the feeding path 44, a fixing unit 46 having a fixing lamp is disposed. A discharging port 48 is formed in the side wall of the apparatus main body 2 in position opposite to the fixing unit 46 and a finisher 50 is mounted on the discharging port 48.

In the transferring section, a developer image, that is, toner image formed on the photosensitive drum 30 is transferred to the paper P by the transfer charger 38. The copy paper P on which the toner image has been transferred is separated from the outer surface of the photosensitive drum 30 by the action of the separation charger 36 and separation claw 40 and fed to the fixing unit 46 via a conveyer belt 52 constructing part of the feeding path 44. Then, after the developer image is melted and fixed on the copy paper P by the fixing unit 46, the copy paper P is discharged to the finisher 50 via the discharging port 48 by means of a paper feeding roller pair 54 and paper discharging roller pair 56.

Below the feeding path 44, an automatic double face printer 56 for reversing or turning over the copy paper P which has passed through the fixing unit 46 and feeding the copy paper to the feeding path 44 again is disposed.

The finisher 50 staples the discharged sheets of copy paper of the document for each copy and stores the same for each copy unit.

In the front upper portion of the apparatus main body 2, an operation panel (which will be described later) for instructing various copying conditions such as copying magnification and start of copying is provided.

Figure 2:
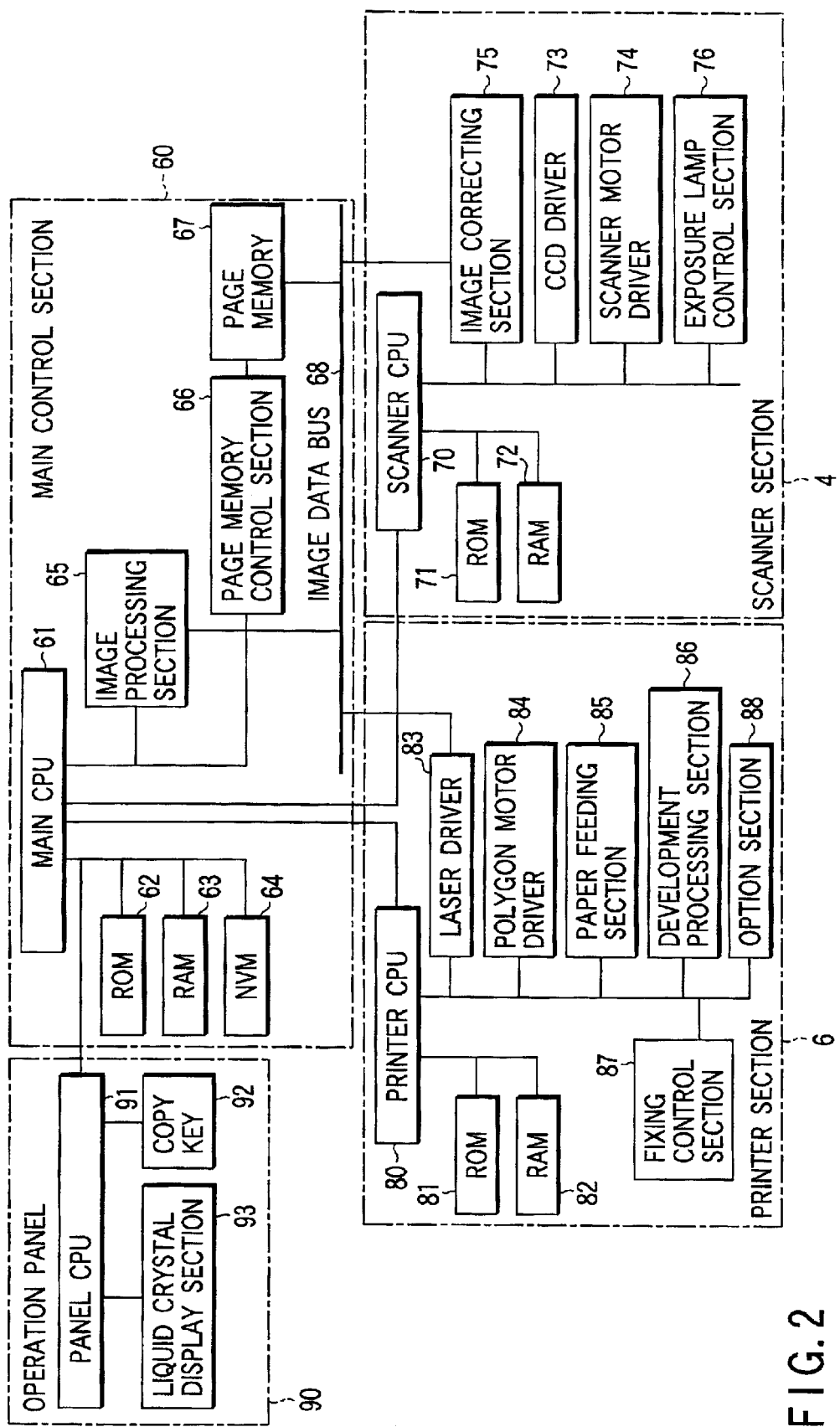
FIG. 2 is a block diagram showing the schematic construction of the digital copying machine.

FIG. 2 is a block diagram schematically showing the electrical connection of the digital copying machine 1 of FIG. 1 and the flow of control signals.

As shown in FIG. 2, in the digital copying machine 1, the control unit is constructed by three CPUs including a main CPU 61 in a main control section 60, a scanner CPU 70 of the scanner section 4 and a printer CPU 80 of the printer section 6. The main CPU 61 performs bi-directional communication (asynchronous serial communication) with the scanner CPU 70 and printer CPU 80 via serial interfaces and the main CPU 61 issues an instruction of the operation and the scanner CPU 70 and printer CPU 80 send back a status signal.

The main control section 60 includes the main CPU 61, ROM 62, RAM 63, NVM 64, image processing circuit 65, page memory control section 66 and page memory 67.

The main CPU 61 controls the whole portion of the main control section 60. In the ROM 62, control data and various control programs such as a control program at the document reading time with respect to detected temperature of the scanner section 4 are stored. The RAM 63 temporarily stores data.

The NVM (nonvolatile random access memory (RAM)) 64 is a nonvolatile memory backed up by a battery (not shown) and data of the NVM 64 can be held even when the power supply is cut off.

The image processing circuit 65 effects various processes such as a shading correction process, smoothing process, edge emphasizing process, enlargement/reduction process, gradation process and the like based on an image processing clock CL supplied from the main CPU 61.

The page memory control section 66 stores image data into the page memory 67 or reads out image data from the page memory 67, or synthesizes characters such as a page font with image data on the page memory 67.

The scanner section 4 includes the scanner CPU 70 for controlling the whole portion of the scanner section 4, a ROM 71 in which a control program and the like are stored, a data storing RAM 72, a CCD driver 73 for driving the CCD sensor 26, a scanner motor driver 74 for controlling rotation of the scanner motor 16 for moving the first and second carriages 14, 18 on which the exposure lamp 10 and mirrors 12, 20, 22 are mounted, an image correcting section 75 for amplifying an output signal from the CCD sensor 26 by use of an analog amplifier (not shown) and converting the signal into a digital signal by use of an A/D converter (not shown), and an exposure lamp control section 76 for controlling the ON/OFF state of the exposure lamp 10 and controlling the light amount of the exposure lamp 10 by controlling the power supplied to the exposure lamp 10.

Further, the RAM 72 stores the image scanning magnification (speed) specified by the main CPU 61.

In the ROM 71, sub-scanning speed error data of prescanning for macro identification for all of the image scanning magnifications is previously stored. Thus, the scanner CPU 70 fetches the sub-scanning speed error data of the magnification (speed) specified by the main CPU 61 from the ROM 71 and supplies the same to the main CPU 61.

The printer section 6 includes the printer CPU 80 for controlling the whole portion of the printer section 6, a ROM 81 in which a control program and the like are stored, a data storing RAM 82, a laser driver 83 for turning ON/OFF emission of light by use of a semiconductor laser (not shown) of the laser exposure unit 28, a polygon motor driver 84 for controlling rotation of a polygon motor of the laser exposure unit 28, a paper feeding section 85 for controlling the operation for feeding the paper P along the feeding path 44, a development processing section 86 for effecting the charging, developing and transferring processes by use of the electric charger 32, developing unit 34 and transfer charger 38, a fixing controlling section 87 for controlling the fixing unit 46 and an option section 88.

Further, the image processing section 65, page memory 67, image correcting section 75 and laser driver 83 are connected via an image data bus 68.

In an operation panel 90, a print key 92 and liquid crystal display section 93 are connected to a panel CPU 91 which is connected to the main CPU 61 and the control operation for the whole portion such as control of the display contents of the liquid crystal display section 93 and processes of input contents is effected.

Thus, the operation states of the printer CPU 80 and scanner CPU 70 are sent back to the main CPU 61 as a status, and therefore, the main CPU 61 can always grasp the states of the printer CPU 80, scanner CPU 70 and can control the whole portion of the copying machine by determining the states thereof and the input contents from the operation panel 90.

Figure 3:
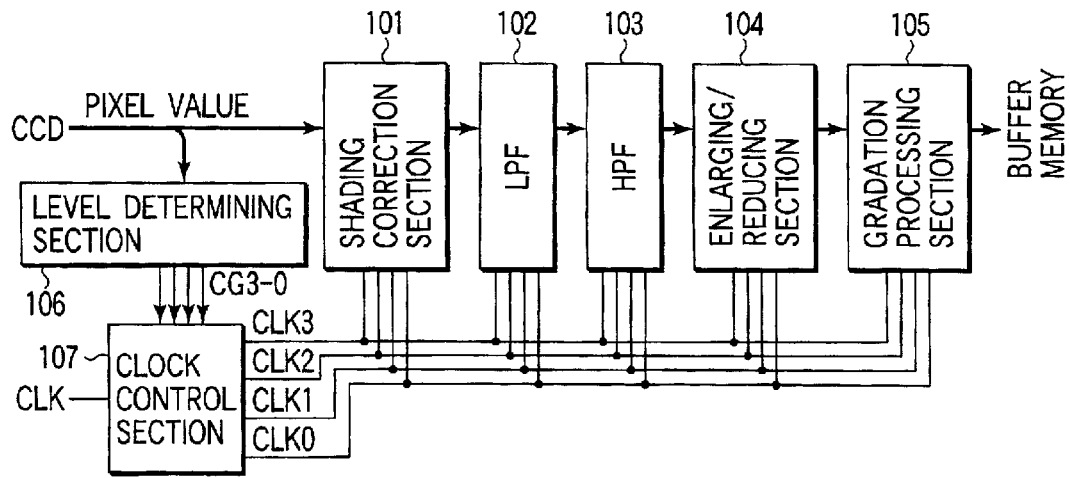
FIG. 3 is a block diagram showing the schematic construction of an image processing section.

FIG. 3 is a block diagram showing the construction of the image processing section 65. In the image processing section 65 shown in FIG. 3, a process is effected for pixels of each line or every several lines. In FIG. 3, blocks for effecting the process for pixels whose pixel value is expressed by eight bits are shown.

As shown in FIG. 3, the image processing section 65 includes a shading correction circuit 101, LPF (Low Pass Filter) 102, HPF (High Pass Filter) 103, enlarging/reducing section 104, gradation processing section 105, level determining section 106 and clock control section 107.

In this case, the shading correction circuit 101, LPF (Low Pass Filter) 102, HPF (High Pass Filter) 103, enlarging/reducing section 104 and gradation processing section 105 construct image processing blocks. An image process of plural steps is effected for image data input from the CCD sensor 26 by use of the image processing blocks 101 to 105.

That is, image data input from the CCD sensor 26 is amplified by an analog amplifier (not shown), converted into a digital signal by an A/D converter (not shown) and then input to the image processing circuit 65.

In the image processing circuit 65, the image data is first subjected to the shading correction process by the shading correction circuit 101. Then, the image data subjected to the shading correction process is subjected to the smoothing process by the LPF (Low Pass Filter) 102. After this, the image data subjected to the smoothing process is subjected to the edge emphasis process by the HPF (High Pass Filter) 103. The edge-emphasized image data is subjected to the image enlarging/reducing process by the enlarging/reducing section 104. Then, the image data subjected to the enlarging/reducing process is subjected to the gradation process such as the error deffusion process or dither process in the gradation processing section 105 and output to a buffer memory (not shown).

The level determining section 106 determines the level of the density value (pixel value) of each pixel of image data input to the image processing circuit 65. The level determining section 106 outputs a plurality of interruption signals (CG0, CG1, CG2, CG3) used for controlling a plurality of clock signals based on the determined level of the pixel value to the clock control section 107.

The clock control section 107 controls output of a plurality of clock signals (CLK0, CLK1, CLK2, CLK3) based on the interruption signals from the level determining section 106. The plurality of clock signals (CLK0, CLK1, CLK2, CLK3) output from the clock control section 107 are supplied to the shading correction circuit 101, LPF 102, HPF 103, enlarging/reducing section 104 and gradation processing section 105. Data items of bits corresponding to the clock signals interrupted by the clock control section 107 are all set to "0".

The level determining section 106 and clock control section 107 may be provided as an image processing circuit incorporated into an image processing LSI together with the image processing blocks or provided as a control circuit for an image processing LSI into which the image processing blocks are incorporated.

Figure 4:
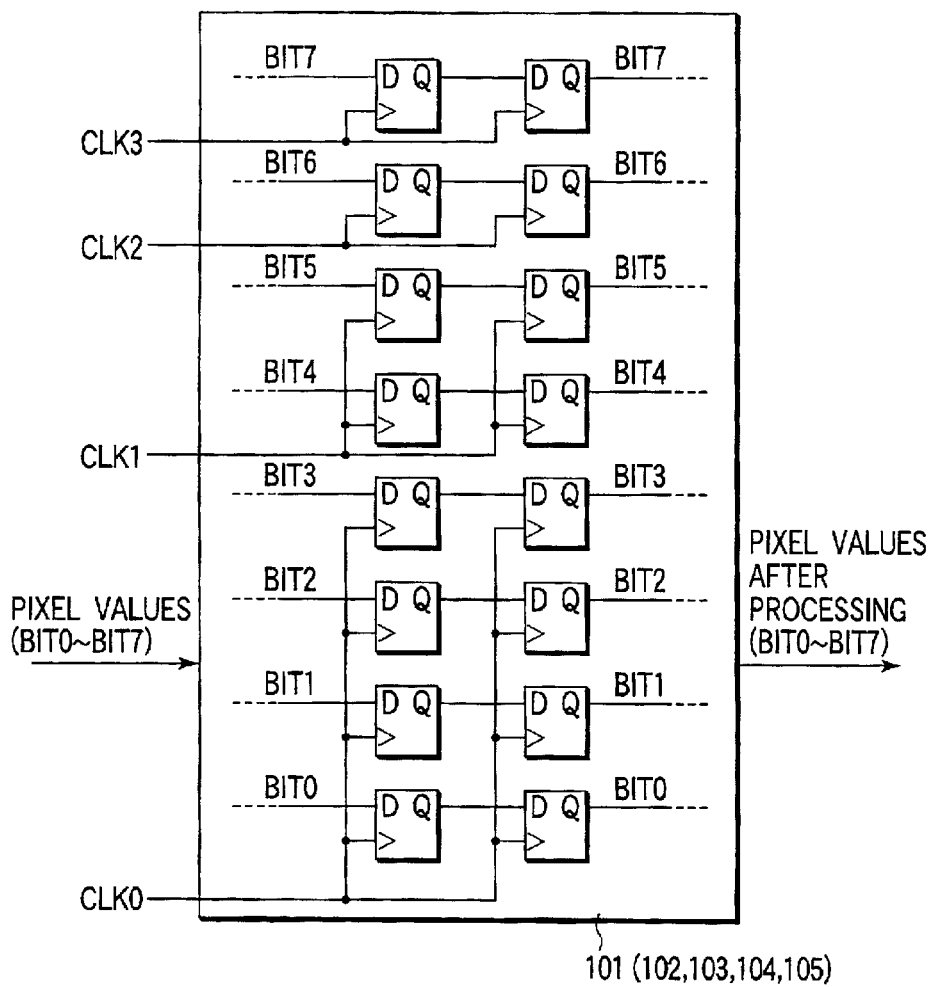
FIG. 4 is a diagram showing the main portion of an image processing block.

FIG. 4 is a diagram showing an example of the construction of the main portion of each image processing block (101 to 105).

Image data is supplied to the shading correction circuit 101, LPF 102, HPF 103, enlarging/reducing section 104 and gradation processing section 105 as data having a pixel value of eight bits (bit 0, bit 1, bit 2, bit 3, bit 4, bit 5, bit 6, bit 7). Further, the clock signals (CLK0, CLK1, CLK2, CLK3) are supplied to each image processing block (101 to 105) by the clock control section 107.

The clock signal CLK0 is a clock signal for the lower four bits (bit 0, bit 1, bit 2, bit 3) of 8-bit data. The clock signal CLK1 is a clock signal for bit 4 and bit 5 of the 8-bit data. The clock signal CLK2 is a clock signal for bit 6 of the 8-bit data. The clock signal CLK3 is a clock signal for bit 7 of the 8-bit data.

Therefore, when only the clock signal CLK0 is supplied, the lower four bits (bit 0, bit 1, bit 2, bit 3) of the 8-bit data become effective and the upper four bits (bit 4, bit 5, bit 6, bit 7) become "0".

Further, when only the clock signals CLK0 and CLK1 are supplied, the lower six bits (bit 0, bit 1, bit 2, bit 3, bit 4, bit 5) of the 8-bit data become effective and the upper two bits (bit 6, bit 7) become "0".

Further, when only the clock signals CLK0, CLK1 and CLK2 are supplied, the lower seven bits (bit 0, bit 1, bit 2, bit 3, bit 4, bit 5, bit 6) of the 8-bit data become effective and the upper one bit (bit 7) becomes "0".

When all of the clock signals CLK0, CLK1, CLK2 and CLK3 are supplied, all of the bits of the 8-bit data become effective.

Next, the construction of the level determining section 106 is explained.

Figure 5:
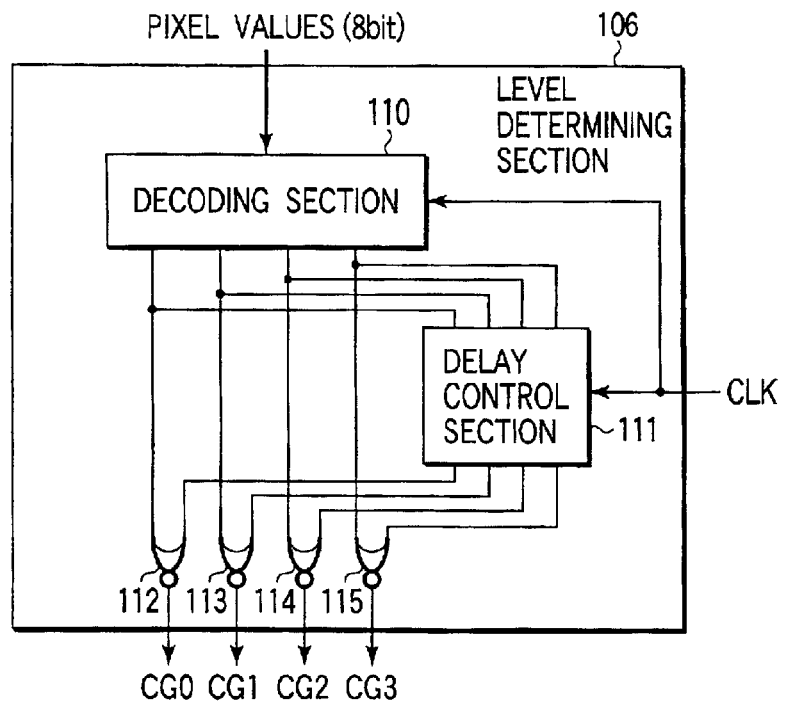
FIG. 5 is a diagram showing an example of the construction of a level determining section.

FIG. 5 is a diagram schematically showing the construction of the level determining section 106. As shown in FIG. 5, the level determining section 106 includes a decoding section 110, delay control section 111 and four NOR gates 112 to 115.

The decoding section 110 determines whether or not the clock signals CLK0, CLK1, CLK2, CLK3 are to be interrupted based on the pixel value of the input eight bits. Data items indicating the determination results (determination results of CLK0, CLK1, CLK2, CLK3) become "0" when the pixel value is set at a level to interrupt the clock signals and become "1" when it is not set at the level to interrupt the clock signals. The determination results of CLK0, CLK1, CLK2, CLK3 are respectively output to the NOR gates 112 to 115 and are output to the delay control circuit 111. The delay control circuit 111 delays the input data items by preset delay time Td and then outputs the respective delayed data items to the NOR gates 112 to 115. In each of the NOR gates 112 to 115, "1" is output when both of the input data items are "0" and "0" is output in other cases.

With the above construction, in each of the NOR gates 112 to 115, "1" is output as an interruption signal (CG0, CG1, CG2, CG3) for interrupting the corresponding clock signal when both of the determination result output from the decoding section 110 and the determination result output with the time delay from the delay control section 111 are "0".

In the example shown in FIG. 5, the determination result of CLK0 from the decoding section 110 and the determination result of CLK0 from the delay control section 111 delayed by the preset delay time Td are input to the NOR gate 112. Likewise, the determination result of CLK1 from the decoding section 110 and the determination result of CLK1 from the delay control section 111 delayed by the preset delay time Td are input to the NOR gate 113. Also, the determination result of CLK2 from the decoding section 110 and the determination result of CLK2 from the delay control section 111 delayed by the preset delay time Td are input to the NOR gate 114. Further, the determination result of CLK3 from the decoding section 110 and the determination result of CLK3 from the delay control section 111 delayed by the preset delay time Td are input to the NOR gate 115.

Therefore, from the NOR gates 112 to 115, the results of NOR operations of the determination results for the pixel values of input data and the determination results for the pixel values obtained the delay time Td ago are output. The output data items from the NOR gates 112 to 115 are interruption signals (CG0, CG1, CG2, CG3) for the clock signals CLK0, CLK1, CLK2, CLK3. The interruption signals CG0, CG1, CG2, CG3 are set to "1" when they are used to interrupt the clock signals CLK0, CLK1, CLK2, CLK3 and set to "0" when they are not used to interrupt the clock signals CLK0, CLK1, CLK2, CLK3.

Further, the delay time Td delayed by the delay control section 111 corresponds to processing time required for the image processing section 65 to process data of input pixel values. That is, the delay time Td corresponds to a period of time from when data of the pixel values is input to the first image processing block 101 until it is output from the final image processing block 105 in the plural stages of image processing blocks 101 to 105 as shown in FIG. 3. In the image processing section 65, the process is effected based on the clock signal. Therefore, the delay time Td is set based on the clock frequency in each image processing block of the image processing section.

Next, the construction of the clock control section 107 is explained.

Figure 6:
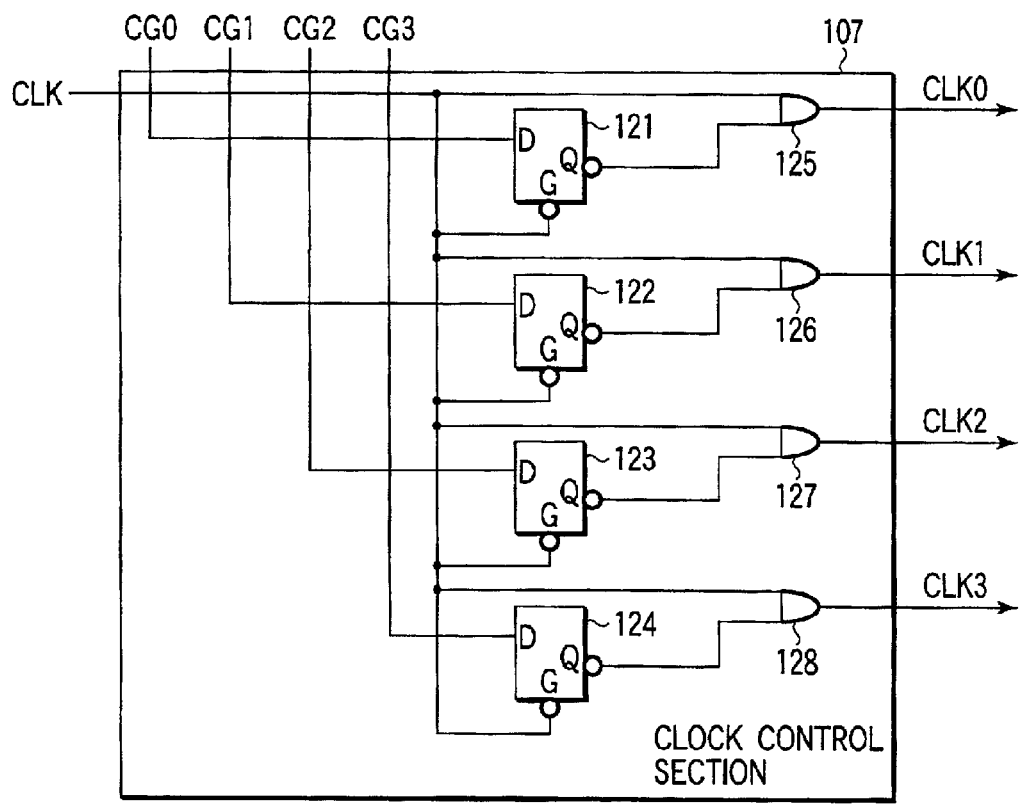
FIG. 6 is a diagram showing an example of the construction of a clock control section.

FIG. 6 is a diagram schematically showing the construction of the clock control section 107. As shown in FIG. 6, the clock control section 107 includes latch circuits 121 to 124 and AND gates 125 to 128.

The latch circuits 121 to 124 are respectively supplied with the interruption signals CG0, CG1, CG2, CG3 from the level determining section 106. Together with the above signals, a reference clock signal CLK used as a reference of the clock signals CLK0, CLK1, CLK2, CLK3 is input to the latch circuits 121 to 124. Therefore, the latch circuits 121 to 124 respectively output the interruption signals synchronized with the reference clock signal CLK to the AND gates 125 to 128.

The AND gates 125 to 128 are supplied with the reference clock signal CLK and the output signals from the respective latch circuits 121 to 124. Therefore, the AND gates 125 to 128 output the reference clock signal CLK as the clock signals CLK0, CLK1, CLK2, CLK3 when the interruption signals "1" synchronized with the reference clock signal CLK are output from the latch circuits 121 to 124.

As described above, the level determining section 106 outputs interruption signals to the clock control section 107 according to the level of the pixel value. In the clock control section 107, the ON/OFF periods of a plurality of clock signals CLK0, CLK1, CLK2, CLK3 obtained by dividing the reference clock signal CLK are controlled based on the interruption signals from the level determining section 106. Thus, the reference clock signal is divided and the divided reference clock signals can be controlled according to the interruption signals, thereby making it possible to reduce unnecessary clock signals.

Next, the output control operation of the clock signals CLK0, CLK1, CLK2, CLK3 is explained.

Figure 7:
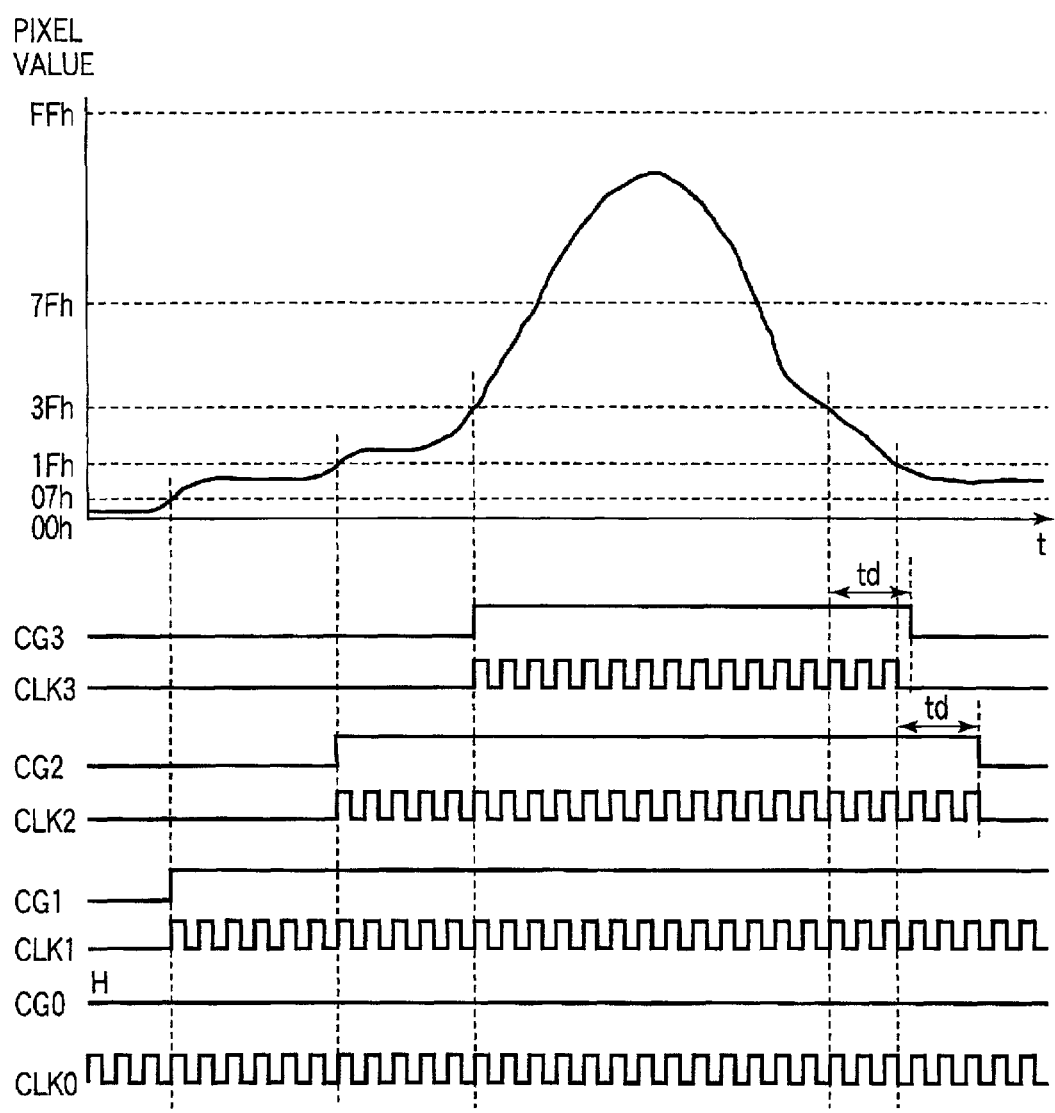
FIG. 7 is a diagram showing an example of output of clock signals for pixel values.

FIG. 7 is a diagram showing an example indicating the relation between the pixel value (density value) and the clock signals CLK0, CLK1, CLK2, CLK3. In the example shown in FIG. 7, it is assumed that the clock signal CLK0 is kept in the ON state and 07h, 1Fh and 3Fh are respectively set as the threshold values of CG1, CG2 and CG3 used as the control signals of the clock signals CLK1, CLK2, CLK3.

The above threshold values are set by taking a variation in data after the image processing operation into consideration. If the threshold values are set by taking only the input pixel value into consideration, there occurs a possibility that correct values cannot be output. For example, when a pixel value after correction becomes larger than the pixel value at the input time, a correct value cannot be output if the clock signal is interrupted. Therefore, the threshold values are set to contain a margin which is set by taking a variation in the pixel value in each of the image processing blocks 101 to 105 into consideration.

For example, data of 3Fh expressed in the hexadecimal notation becomes "00111111" expressed in the binary notation corresponding to eight bits. When such data is input and if the pixel value becomes larger than 3Fh in the image processing block, the upper two bits (bit 6 or bit 7) of the eight bits will become "1". Therefore, if 3Fh is set as the threshold value of the clock signal CLK2, the upper two bits become "0" since no clock signal that makes the upper two bits active, even when the pixel value becomes larger than 3Fh. In order to cope with this case, in the example shown in FIG. 7, the threshold value of the clock signal CLK3 that makes the bit 7 active, which is the most significant bit of the eight bits is set to 3Fh ("00111111"), the threshold value of the clock signal CLK2 that makes the bit 6 active, is set to 1Fh ("00011111") and the threshold value of the clock signal CLK1 that makes the bit 5 and bit 4 active, is set to 07 ("00000111"). It is assumed that the clock signal CLK0 is always supplied.

Thus, the threshold values used for interrupting the clock signals divisionally supplied to the image processing blocks are set by taking a variation range of data caused in the processes of the image processing blocks into consideration. Therefore, even if the clock signal is interrupted, the image processing circuit effects the image processing operation without causing any problem.

Figure 8:
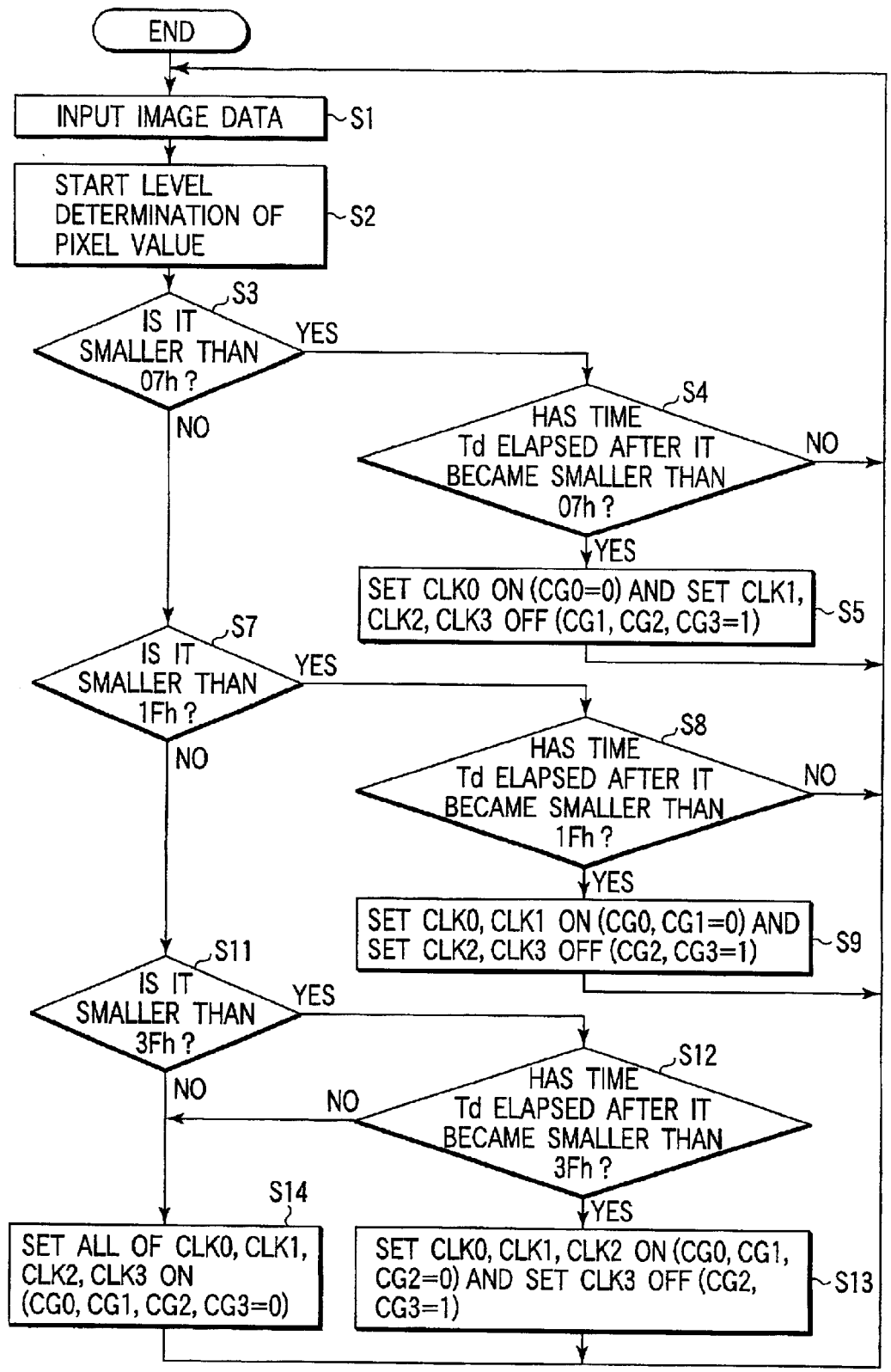
FIG. 8 is a flowchart for illustrating an output control operation for each clock signal.

FIG. 8 is a flowchart for illustrating the clock control operation according to the level of the input pixel value. In this example, a case wherein the threshold values as shown in FIG. 7 are set for the 8-bit pixel value is explained.

First, assume that image data read by the scanner section 4 is input to the image processing section 65 (step S1). In the image processing section 65 to which the image data is input, a pixel value expressed by eight bits for each pixel of the image data is input to the level determining section 106. The level determining section 106 starts the level determining process for the input pixel value (step S2).

That is, the level determining section 106 first determines whether the level of the pixel value input to the decoding section 110 is smaller than 07h ("00000111") or not (step S3). If it is determined in the determining step that the level of the pixel value is smaller than 07h (step S3, "YES"), the level determining section 106 determines whether or not time longer than the preset delay time Td has elapsed after the pixel value was changed from a value which is not smaller than 07h to a value which is smaller than 07h by use of the delay control section 111 and NOR gate 113 (step S4).

If it is determined in the above determining step that time longer than the preset delay time Td has elapsed after the pixel value became smaller than 07h (step S4, "YES"), the level determining section 106 decides that the clock signal CLK0 is ON and the clock signals CLK1, CLK2, CLK3 are OFF. According to the above decision, the level determining section 106 outputs "0" as the interruption signal CG0 from the NOR gate 112 and outputs "1" as the interruption signals CG1, CG2, CG3 from the NOR gates 113 to 115. In response to the interruption signals CG0 to CG3 from the level determining section 106, the clock control section 107 supplies the clock signal CLK0 and interrupts the clock signals CLK1, CLK2, CLK3 (step S5).

Further, if it is determined in the step S4 that the pixel value is kept smaller than 07h after starting the level determination process, that is, the pixel value is kept set in a range of 00h to 07h after starting the level determination process, the result of determination in the level determining section 106 becomes "YES" and the process proceeds to the step S5.

If it is determined in the above determining step that time longer than the preset delay time Td has not elapsed after the pixel value became smaller than 07h (step S4, "NO"), the level determining section 106 keeps the output states (ON/OFF states) of the clock signals CLK0, CLK1, CLK2, CLK3 unchanged.

Further, if it is determined in the step S3 that the level of the pixel value is not smaller than 07h (step S3, "NO"), the level determining section 106 determines whether or not the level of the pixel value is smaller than 1Fh by use of the decoding section 110 (step S7). If it is determined in the above determining step that the level of the pixel value is smaller than 1Fh (step S7, "YES"), the level determining section 106 determines whether or not time longer than the preset delay time Td has elapsed after the pixel value was changed from a value which is not smaller than 1Fh to a value which is smaller than 1Fh by use of the delay control section 111 and NOR gate 114 (step S8).

If it is determined in the above determining step that time longer than the preset delay time Td has elapsed after the pixel value became smaller than 1Fh (step S8, "YES"), the level determining section 106 decides that the clock signals CLK0, CLK1 are ON and the clock signals CLK2, CLK3 are OFF. According to the above decision, the level determining section 106 outputs "0" as the interruption signals CG0, CG1 from the NOR gates 112, 113 and outputs "1" as the interruption signals CG2, CG3 from the NOR gates 114, 115. In response to the interruption signals CG0 to CG3 from the level determining section 106, the clock control section 107 supplies the clock signals CLK0, CLK1 and interrupts the clock signals CLK2, CLK3 (step S9).

Further, if it is determined in the step S8 that the pixel value is kept smaller than 1Fh after it became equal to or larger than 07h, that is, the pixel value is kept set in a range of 07h to 1Fh after it became equal to or larger than 07h, the result of determination in the level determining section 106 becomes "YES" and the process proceeds to the step S9.

If it is determined in the above determining step that time longer than the preset delay time Td has not elapsed after the pixel value became smaller than 1Fh (step S8, "NO"), the level determining section 106 keeps the output states (ON/OFF states) of the clock signals CLK0, CLK1, CLK2, CLK3 unchanged.

Further, if it is determined in the step S7 that the level of the pixel value is not smaller than 1Fh (step S7, "NO"), the level determining section 106 determines whether or not the level of the pixel value is smaller than 3Fh by use of the decoding section 110 (step S11). If it is determined in the above determining step that the level of the pixel value is smaller than 3Fh (step S11, "YES"), the level determining section 106 determines whether or not time longer than the preset delay time Td has elapsed after the pixel value was changed from a value which is not smaller than 3Fh to a value which is smaller than 3Fh by use of the delay control section 111 and NOR gate 115 (step S12).

If it is determined in the above determining step that time longer than the preset delay time Td has elapsed after the pixel value became smaller than 3Fh (step S12, "YES"), the level determining section 106 decides that the clock signals CLK0, CLK1, CLK2 are ON and the clock signal CLK3 is OFF. According to the above decision, the level determining section 106 outputs "0" as the interruption signals CG0, CG1, CG2 from the NOR gates 112, 113, 114 and outputs "1" as the interruption signal CG3 from the NOR gate 115. In response to the interruption signals CG0 to CG3 from the level determining section 106, the clock control section 107 supplies the clock signals CLK0, CLK1, CLK2 and interrupts the clock signal CLK3 (step S13).

Further, if it is determined in the step S12 that the pixel value is kept smaller than 3Fh after it became equal to or larger than 1Fh, that is, the pixel value is kept set in a range of 1Fh to 3Fh after it became equal to or larger than 1Fh, the result of determination in the level determining section 106 becomes "YES" and the process proceeds to the step S13.

If it is determined in the above determining step that time longer than the preset delay time Td has not elapsed after the pixel value became smaller than 3Fh (step S12, "NO") or it is determined in the step S11 that the level of the pixel value is not smaller than 3Fh (step S11, "NO"), the level determining section 106 decides that all of the clock signals CLK0, CLK1, CLK2, CLK3 are ON. According to the above decision, the level determining section 106 outputs "0" as the interruption signals CG0, CG1, CG2, CG3 from the NOR gates 112, 113, 114, 115. In response to the interruption signals CG0 to CG4 from the level determining section 106, the clock control section 107 supplies all of the clock signals CLK0, CLK1, CLK2, CLK3 (step S14).

As described above, the clock signal is divided according to bits of data input to the image processing circuit and supply and interruption of the divided clock signals are controlled according to the value of the data. Thus, it is possible to interrupt the clock signal to be supplied for the bit which is not used for a long period of time among the bits of the data and reduce the power consumption of the image processing circuit.

Further, in the case of a copying machine, since a document having a white ground on which letters are described is often used, a large number of pixels having small density values are provided in the image read by the scanner section 4. In this case, in the upper positions of the bits indicating the density value of image data input to the image processing circuit, "0" successively occurs. In such a case, the clock signal is divided according to the bits of the density value of the input image data, the threshold values are previously set respectively for the divided clock signals, the threshold values are compared with the density value of the image data, and the clock signal corresponding to the threshold value is interrupted according to the comparison result. Therefore, in a case of a document such as a document having the white ground which contains a large number of pixels having small density values, the clock signal corresponding to the upper bits can be interrupted and the power consumption of the image processing circuit can be reduced.

Figure 9:
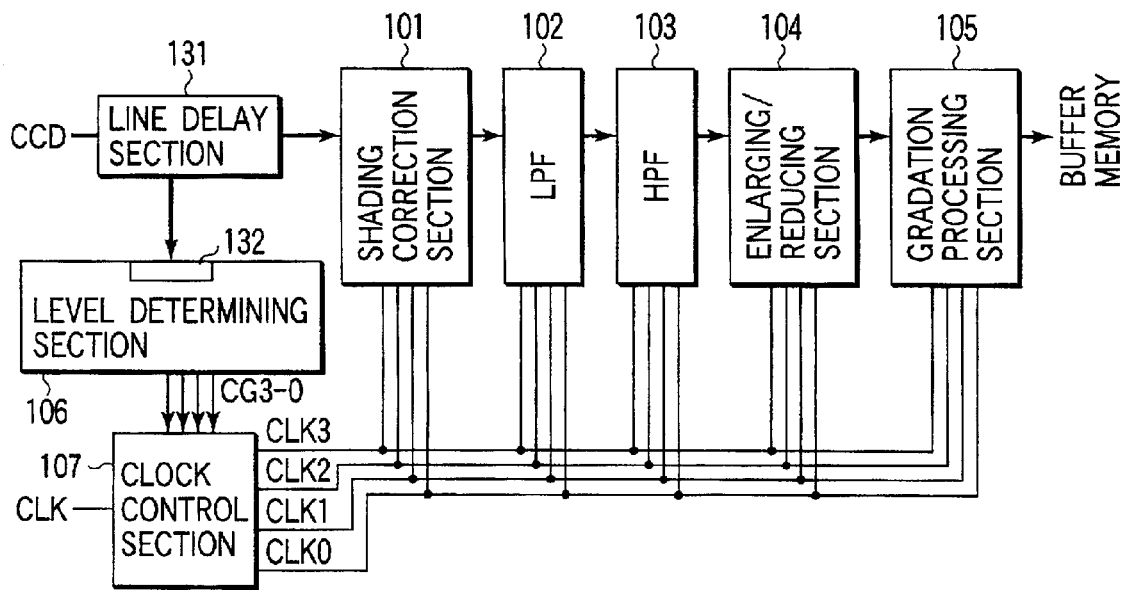
FIG. 9 is a block diagram showing another example of the construction of the image processing section.

FIG. 9 shows another example of the construction of the image processing section 65 as shown in FIG. 3. In FIG. 9, portions which are the same as those of FIG. 3 are denoted by the same reference numerals and the explanation therefor is omitted.

In the circuit of FIG. 9, a line delay section 131 for temporarily storing input pixel values is additionally provided for the circuit of FIG. 3. The line delay section 131 is constructed by a RAM, for example. In the line delay section 131, output of data to the image processing blocks 101 to 105 of the image processing circuit is delayed by one clock or several clocks by temporarily storing input pixel values. Further, in the level determining section 106, an access circuit 132 to the RAM used as the line delay section 131 is provided. The level determining section 106 can refer to data stored in the line delay section 131 by use of the access circuit 132.

In the image processing section 65 with the above construction, delayed data is input to the image processing blocks 101 to 105. The level determining section 106 can refer to data before the data is input to the image processing blocks 101 to 105. As a result, in the circuit of FIG. 9, it becomes possible to attain the control operation for the clock signals which is the same as that of the circuit shown in FIG. 3 and perform a level determination process for the level of the pixel value before image data is actually input to the image processing blocks 101 to 105. Therefore, extra time corresponding to time (the number of clocks) by which data is delayed by the line delay section 131 can be additionally provided for the process effected by the level determining section 106 and clock control section 107. Thus, even if time corresponding to time by which data is delayed by the line delay section 131 is taken for the data determining process, supply of data input to the image processing blocks can be synchronized with the clock control based on the data determination result.

Figure 10:
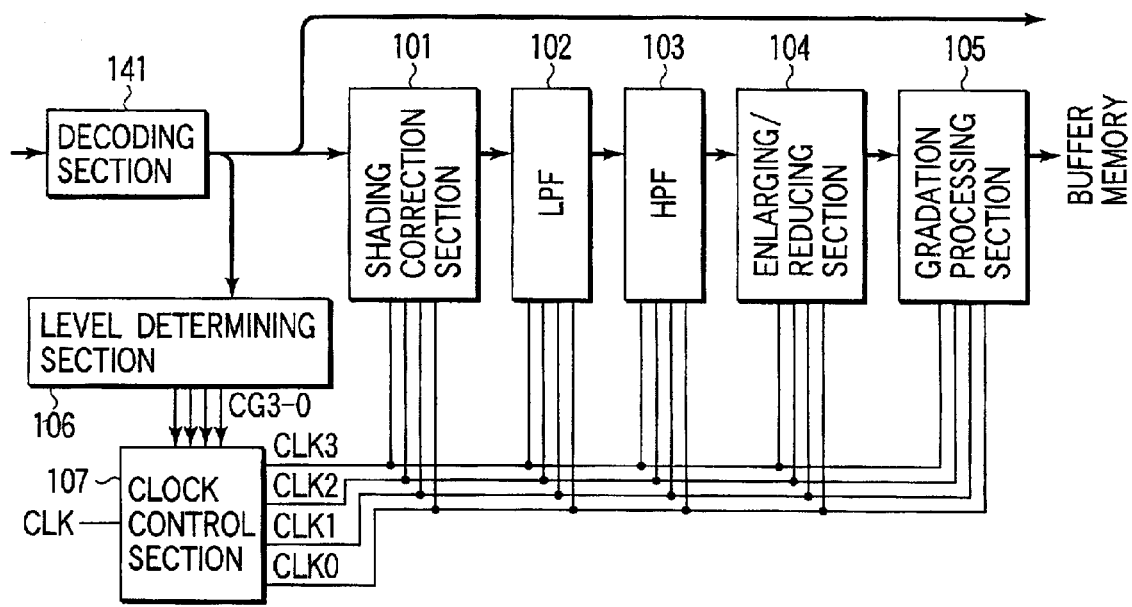
FIG. 10 is a block diagram showing another example of the construction of the image processing section.

FIG. 10 shows another example of the construction of the image processing section 65 as shown in FIG. 3. In FIG. 10, portions which are the same as those of FIG. 3 are denoted by the same reference numerals and the explanation therefor is omitted. FIG. 10 shows an example of the construction to which image data decoded in a decoding section 141 is input. In the circuit of FIG. 10, for example, image data compressed and stored in a hard disk device (not shown) is decoded and input.

Data decoded in the decoding section 141 does not use the entire bit width in some cases. In this case, data whose bit width is smaller than the bit width of an image data bus is assigned and transferred. Therefore, the level determining section 106 can effect the same process as that of FIG. 3 by determining bits in which no data exists as "0".

Further, in the level determining section 106, the result of decoding in the decoding section 141 can be used. In this case, the level determining section 106 determines the level of the pixel value by determining the upper bit in which data is "0" based on the decoding result in the decoding section 141. As a result, the same clock control operation as that of the circuit shown in FIG. 3 can be attained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing circuit driven by a clock signal for processing data expressed by a plurality of bits, comprising:

a level determining section for determining whether or not a value of input data is smaller than a preset value; and a clock control section for supplying a clock signal that makes a bit corresponding to the preset value active, when said level determining section determines that the value of the input data is not smaller than the preset value and interrupting supply of a clock signal that makes a bit corresponding to the preset value active, when said level determining section determines that the value of the input data is smaller than the preset value, wherein said level determining section delays the result of determination by preset delay time from when values of successively input data items are changed from a value which is not smaller than the preset value to a value which is smaller than the preset value until the preset delay time has elapsed in a case where the values of the successively input data items are changed from the value which is not smaller than the preset value to the value which is smaller than the preset value.

2. The image processing circuit according to claim 1, wherein the delay time is image processing time from when data is input to the image processing circuit until the data is output therefrom.

3. An image processing apparatus including an image processing circuit driven by a clock signal for processing image data expressed by a plurality of bits, comprising:

a level determining section for determining whether or not a density value of image data input to the image processing circuit is smaller than a preset density value; and a clock control section for supplying a clock signal that makes a bit corresponding to the preset density value active, when said level determining section determines that the density value of the input image data is not smaller than the preset density value and interrupting supply of a clock signal that makes a bit corresponding to the preset density value active, when said level determining section determines that the density value of the input image data is smaller than the preset density value, wherein said level determining section delays the result of determination by preset delay time from when density values of successively input image data items are changed from a value which is not smaller than the preset density value to a value which is smaller than the preset density value until the preset delay time has elapsed in a case where the density values of the successively input image data items are changed from the value which is not smaller than the preset density value to the value which is smaller than the preset density value.

4. A control method for controlling an image processing circuit driven by a clock signal for processing data expressed by a plurality of bits, comprising:

a first step of determining whether or not a value of input data is smaller than a preset value; and a second step of supplying a clock signal that makes a bit corresponding to the preset value active, when it is determined in said first step that the value of the input data is not smaller than the preset value and interrupting supply of a clock signal that make a bit corresponding to the preset value active, when it is determined in said first step that the value of the input data is smaller than the preset value, wherein said first step includes a step of delaying the result of determination by preset delay time from when values of successively input data items are changed from a value which is not smaller than the preset value to a value which is smaller than the preset value until the preset delay time has elapsed in a case where the values of the successively input data items are changed from the value which is not smaller than the preset value to the value which is smaller than the preset value.

* * * * *

UNITED STATES PATENT AND TRADEMARK OFFICE
CERTIFICATE OF CORRECTION

PATENT NO. : 6,937,364 B2  Page 1 of 1
DATED : August 30, 2005
INVENTOR(S) : Minoru Suzuki It is certified that error appears in the above-identified patent and that said Letters Patent is hereby corrected as shown below:

<u>Title page,</u>
Item [22], PCT Filing Date, the filing date should be -- Nov. 30, 2000 --.

Signed and Sealed this

Eleventh Day of October, 2005

JON W. DUDAS
*Director of the United States Patent and Trademark Office*